United States Patent
Asano (10) Patent No.: US 8,434,782 B2
(45) Date of Patent: May 7, 2013

(54) ROOF STRUCTURE FOR AUTOMOBILE (75) Inventor: Yuta Asano, Hamamatsu (JP)

(73) Assignee: Suzuki Motor Corporation (JP)

(*) Notice: Subject to any disclaimer, the term of this patent is extended or adjusted under 35 U.S.C. 154(b) by 92 days.

(21) Appl. No.: 13/151,377

(22) Filed: Jun. 2, 2011

(65) Prior Publication Data
US 2011/0304127 A1 Dec. 15, 2011

(30) Foreign Application Priority Data
Jun. 11, 2010 (JP) ................... 2010-133820

(51) Int. Cl.
B60R 21/213 (2011.01)

(52) U.S. Cl.
USPC ............. 280/730.2; 280/728.2; 296/210

(58) Field of Classification Search ........... 280/728.2, 280/730.2; 296/210, 214; B60R 21/213, B60R 21/214
See application file for complete search history.

(56) References Cited

U.S. PATENT DOCUMENTS

| | | | | |
|---|---|---|---|---|
| 5,791,683 A * | 8/1998 | Shibata et al. | ............. | 280/730.2 |
| 5,884,937 A * | 3/1999 | Yamada | ............. | 280/730.2 |
| 5,921,575 A * | 7/1999 | Kretschmer et al. | ........ | 280/728.2 |
| 6,022,044 A * | 2/2000 | Cherry | ............. | 280/730.2 |
| 6,129,377 A * | 10/2000 | Okumura et al. | ......... | 280/730.2 |
| 6,142,509 A * | 11/2000 | White et al. | ............. | 280/730.2 |
| 6,279,941 B1 * | 8/2001 | Nakajima et al. | .......... | 280/728.2 |
| 6,460,879 B2 * | 10/2002 | Tanase et al. | ............. | 280/730.2 |
| 6,485,048 B2 * | 11/2002 | Tajima et al. | ............. | 280/728.2 |
| 6,616,179 B2 * | 9/2003 | Tanase et al. | ............. | 280/730.2 |
| 6,705,635 B2 * | 3/2004 | Hoeft et al. | ................ | 280/728.2 |
| 6,848,711 B2 * | 2/2005 | Yamamura et al. | ........ | 280/730.2 |
| 6,860,506 B2 * | 3/2005 | Ogata et al. | ............. | 280/730.2 |
| 7,040,652 B2 | 5/2006 | Ogata et al. | | |
| 7,134,682 B2 * | 11/2006 | Totsuka et al. | ............. | 280/728.2 |
| 7,159,896 B2 * | 1/2007 | Ochiai et al. | ............. | 280/730.2 |
| 7,520,527 B2 * | 4/2009 | Yamagiwa et al. | ........ | 280/730.2 |
| 7,621,556 B2 * | 11/2009 | Itakura | ...................... | 280/728.2 |
| 7,677,593 B2 * | 3/2010 | Downey | ..................... | 280/728.2 |
| 7,862,075 B2 * | 1/2011 | Minamikawa | ............. | 280/730.1 |
| 7,871,103 B2 * | 1/2011 | Torii | ......................... | 280/728.2 |

FOREIGN PATENT DOCUMENTS

| | | |
|---|---|---|
| DE | 10254453 A1 | 7/2003 |
| JP | 2002-211345 | 7/2002 |
| JP | 2010095225 A * | 4/2010 |

OTHER PUBLICATIONS

German Office Action corresponding to German Application No. 102011104276.1 issued Feb. 27, 2013.

* cited by examiner

Primary Examiner — Joseph Rocca
Assistant Examiner — Laura Freedman
(74) Attorney, Agent, or Firm — Myers Bigel Sibley & Sajovec, P.A.

(57) ABSTRACT

A roof structure for an automobile includes an airbag 7 configured to protect the head of an occupant and an attachment bracket 8. In the roof structure for an automobile, the airbag 7 is attached across a front pillar 4 and a roof side 1 via the attachment bracket 8, and the attachment bracket 8 is arranged on the back side of a periphery of a joint portion 33 of an upper end portion of a front pillar trim 5 and a headliner 3.

4 Claims, 6 Drawing Sheets

ROOF STRUCTURE FOR AUTOMOBILE

CROSS-RELATED APPLICATIONS

This application claims priority from Japanese Patent Application No. 2010-133820; filed Jun. 11, 2010, the disclosure of which is incorporated herein by reference in its entirety.

BACKGROUND OF THE INVENTION

The present invention relates to a roof structure for an automobile, in which an airbag for protecting the head of an occupant is attached along a front pillar and a roof side via an attachment bracket.

Airbags are inflated and deployed between occupants and glass portions of side doors from a roof side at the time of a side collision or the like and thus protect the heads of the occupants (See JP 2002-211345 A).

Conventionally, brackets used to attach an airbag have been arranged at positions away from a joint portion (superposed portion) of an upper end portion of a front pillar trim and a headliner.

In a roof structure for an automobile, a bag body of an airbag is housed in a space on the back side of the front pillar trim and the headliner. This bag body is made of a soft cloth material. The bag body is wound into a roll or folded, and is then housed in the space on the back side of the front pillar trim and the headliner. For this reason, the joint portion in which the end portion of the front pillar trim and the end portion of the headliner are superposed with each other is likely to be lifted (the joint portion is lifted up toward an inner side of the vehicle interior) due to spreading of the bag body as compared with other portions. Here, the joint portion on the headliner has a lower rigidity than the joint portion on the front pillar trim because the headliner is large in size and small in thickness whereas the front pillar trim is small in size and thus is capable of securing the rigidity. Accordingly, the joint portion on the headliner is more likely to be lifted.

In the aforementioned conventional structure, the attachment brackets are arranged at the positions away from the joint portion of the upper end portion of the front pillar trim and the headliner. For this reason, it is difficult for the attachment brackets to suppress the spreading of the bag body. As a result, it becomes difficult to prevent the headliner from being lifted, and the exterior of the joint portion is thus degraded.

Here, increasing the number of clips or the like for fixing the joint portion, or providing the headliner with a holder to stabilize the joint portion of the upper end portion of the front pillar trim and the headliner may be considered as a possible measure. However, such measures may inhibit the inflation and deployment of the airbag. Meanwhile, there are problems such as that the space used to fix the joint portion cannot be increased because the airbag also occupies a space.

SUMMARY OF THE INVENTION

The present invention has been made in view of the aforementioned current situation and aims to provide a roof structure for an automobile, which includes an airbag provided along a front pillar and a roof side to protect the head of an occupant and which is capable of preventing a joint portion of a front pillar trim and a headliner from being lifted and of stabilizing the exterior of the joint portion.

The present invention provides a roof structure for an automobile, comprising an airbag configured to protect the head of an occupant, and an attachment bracket. In the roof structure, the airbag is attached across a front pillar and a roof side via the attachment bracket, and the attachment bracket is arranged on a back side of a periphery of a joint portion of an upper end portion of a front pillar trim and a headliner, thereby suppressing the spreading of a bag body of the airbag.

According to the aforementioned configuration, the attachment bracket is arranged on the back side of the periphery of the joint portion of the upper end portion of the front pillar trim and the headliner and thereby suppresses the spreading of the bag body, thus making it possible to prevent the headliner from being lifted.

Thus, there is no need to increase the number of clips or the like for fixing the joint portion of the upper end portion of the front pillar trim and the headliner, or to provide the headliner with a holder to stabilize the joint portion, as a measure to prevent the joint portion from being lifted.

As a result, deployment of the airbag is not inhibited, and it is also possible to increase the degree of freedom in the layout of other components such as a harness and a drain hose provided in the roof side and the front pillar. Furthermore, the number of components can be reduced, and the manufacturing cost can be thus reduced. In addition, the number of assembly steps can be reduced as well.

According to another aspect of the present invention, an attachment base portion of an opening trim is attached to an opening periphery for door, the opening periphery formed on the front pillar and the roof side, and an end portion of the headliner in a vehicle width direction is retained between a lip provided on the attachment base portion of the opening trim and a retaining portion provided on the attachment bracket. This configuration achieves the following effects.

The lip provided to the attachment base portion of the opening trim and the retaining portion provided on the attachment bracket retain the end portion of the headliner in the vehicle width direction. Thus, the headliner can be surely prevented from being lifted.

In addition, even in a case in which a force to press the headliner from the inner side of the vehicle interior is generated, the retaining portion of the attachment bracket on the back side of the headliner surely receives the force. Thus, the end portion of the headliner in the vehicle width direction can be prevented from deforming. Accordingly, it is possible to prevent giving an impression of a lack of rigidity in the headliner and thus to create an impression of a luxury interior structure.

According to another aspect of the present invention, the attachment bracket includes a holding portion configured to hold the bag body of the airbag, the attachment bracket is positioned on a vehicle-width-direction outer side of the bag body of the airbag, and the retaining portion extends toward the vehicle-width-direction outer side from the holding portion. This configuration achieves the following effects.

The retaining portion extends toward the vehicle-width-direction outer side from the holding portion. Thus, the retaining portion does not inhibit inflation and deployment of a curtain airbag during the inflation and deployment of the curtain airbag.

According to another aspect of the present invention, the attachment bracket is attached and fixed by an attachment bolt to any one of a front pillar panel and a roof side panel, and the attachment bracket includes a locking portion configured to be locked with a locked portion and thereby to inhibit rotation of the attachment bracket, the locked portion formed on the one of the front pillar panel and the roof side panel. This configuration achieves the following effects.

The attachment bracket includes the locking portion configured to be locked with a locked portion and thereby to inhibit rotation of the attachment bracket, the locked portion formed on the front pillar panel or the roof side panel. Thus, the attachment bracket can be prevented from being misaligned with the headliner.

Here, the rotation of the attachment bracket can be prevented even with only one attachment bolt. Thus, as compared with a structure in which the rotation of the attachment bracket is prevented by attachment and fixation of the attachment bracket to the front pillar panel or the roof side panel by use of multiple attachment bolts, for example, this structure allows a reduction in the number of components and also a reduction in the labor required for the attachment operation with the attachment bolt.

Moreover, the rotation of the attachment bracket can be prevented during the operation of attaching and fixing the attachment bracket to the front pillar panel or the roof side by the attachment bolt. Thus, the workability of the attachment operation can be improved.

According to the present invention, a joint portion of a front pillar trim and a headliner can be prevented from being lifted, and the exterior of the joint portion can be stabilized in a roof structure for an automobile, which includes an airbag provided across a front pillar and a roof side in order to protect the head of an occupant. Moreover, the present invention enables an increase in the degree of freedom in the layout of other components such as a harness and a drain hose provided in the roof side and the front pillar. Thus, the number of components can be reduced, and the manufacturing cost can be thereby reduced. In addition, the number of assembly steps can be reduced as well.

DETAILED DESCRIPTION OF PREFERRED EMBODIMENTS

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

Figure 2:
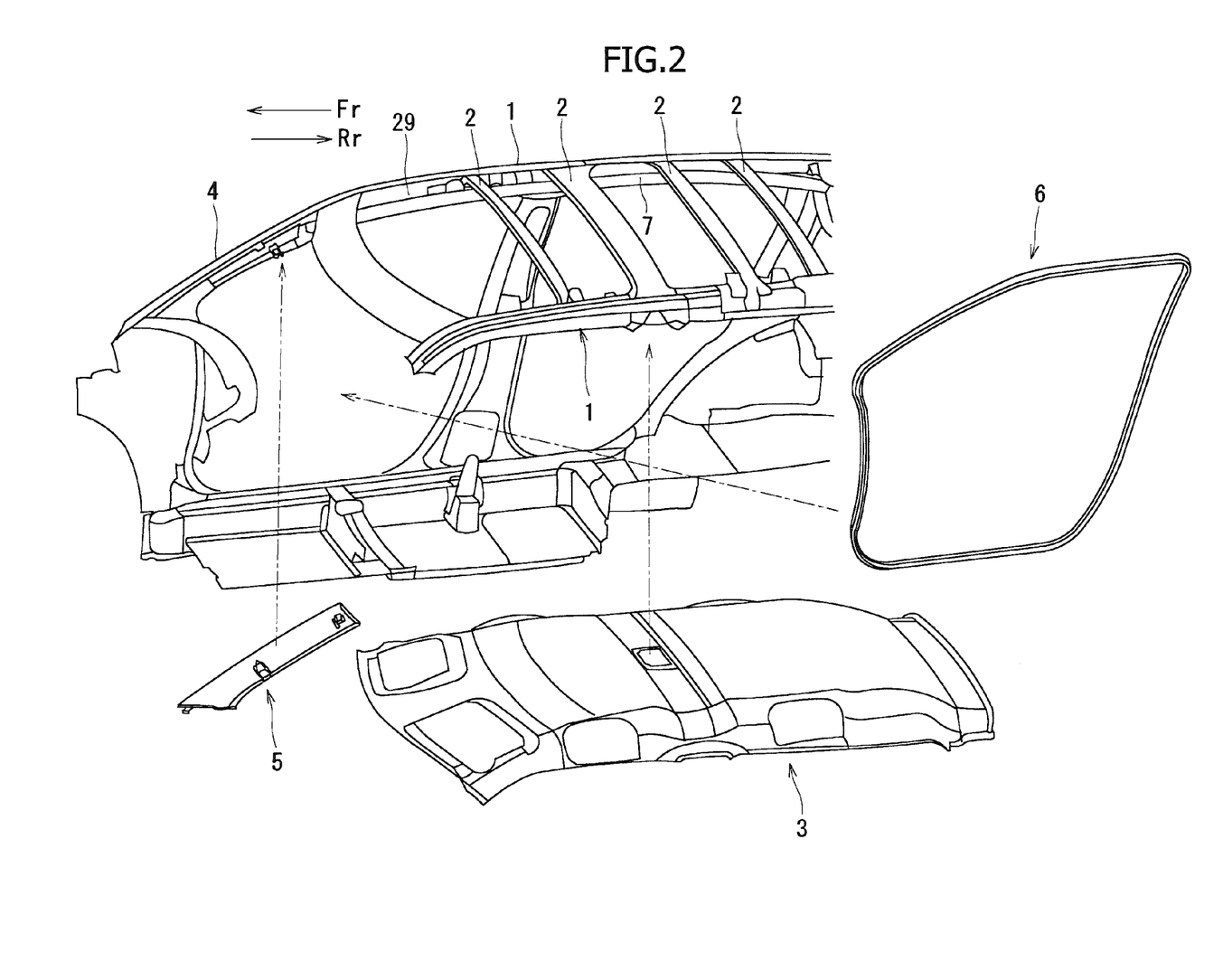
FIG. 2 is an exploded perspective view illustrating how a front pillar trim, a headliner, an opening trim, and the like are attached to the vehicle body.
Figure 3:
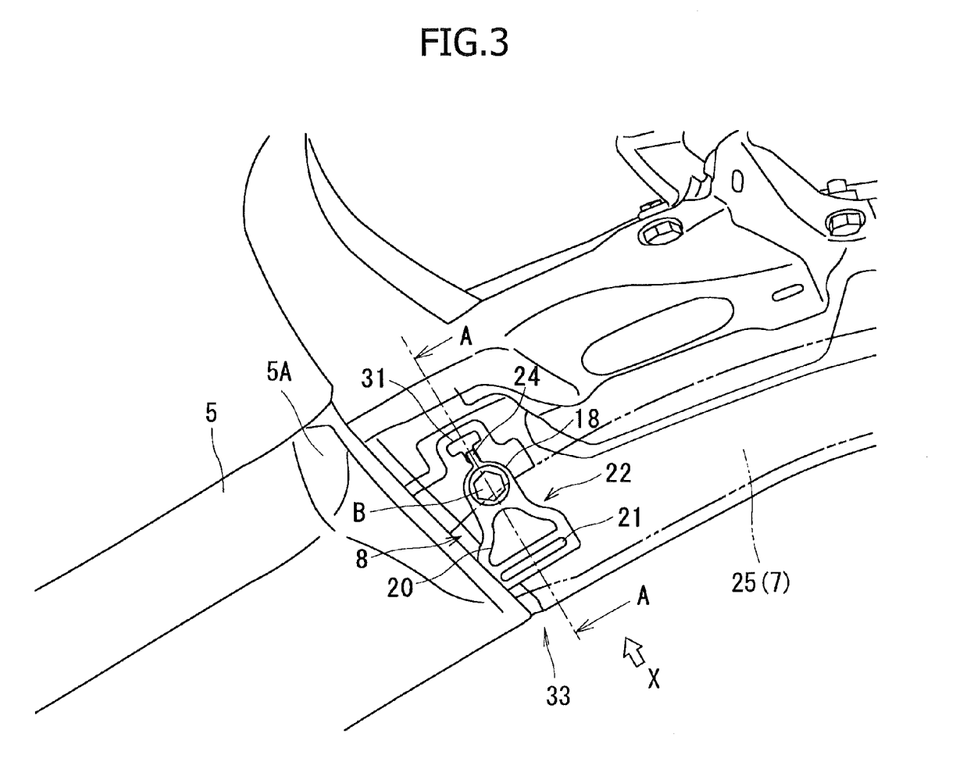
FIG. 3 is a diagram illustrating an attachment structure of an attachment bracket.
Figure 4:
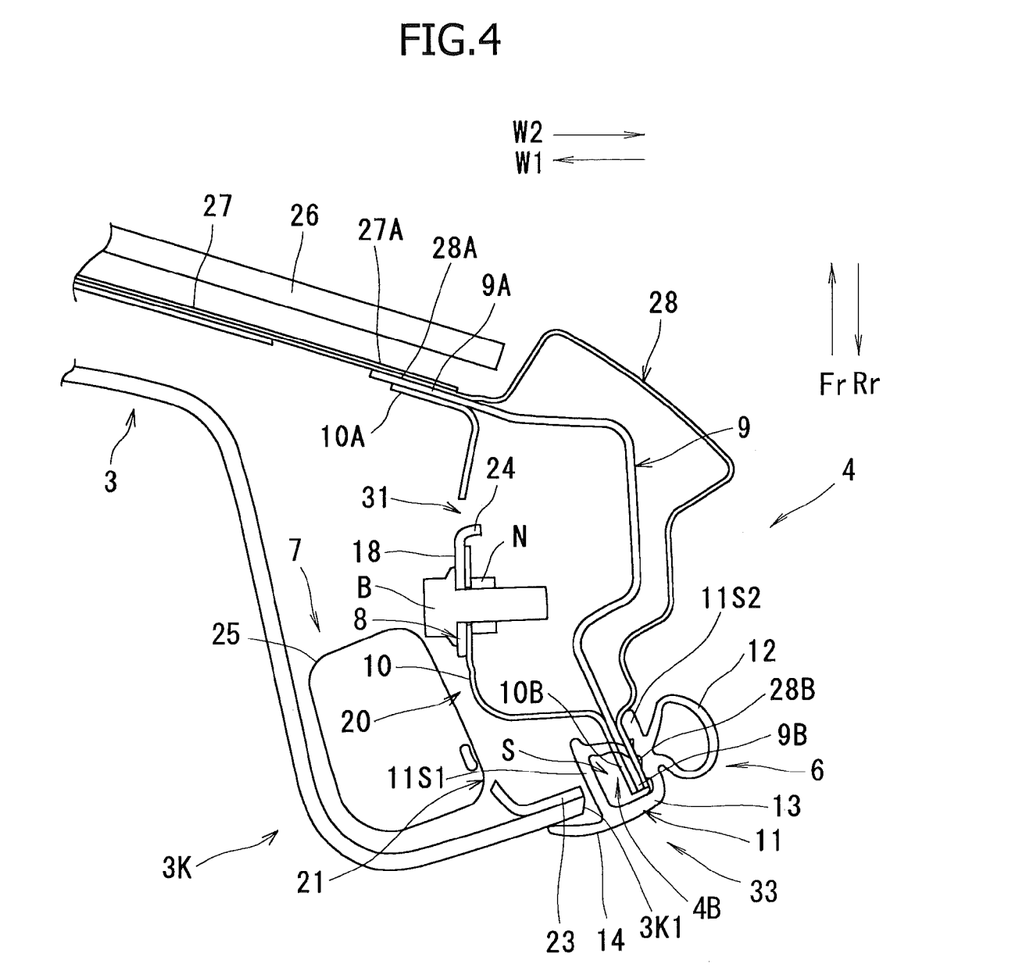
FIG. 4 is a cross-sectional view taken along the line A-A of FIG. 3.
Figure 5:
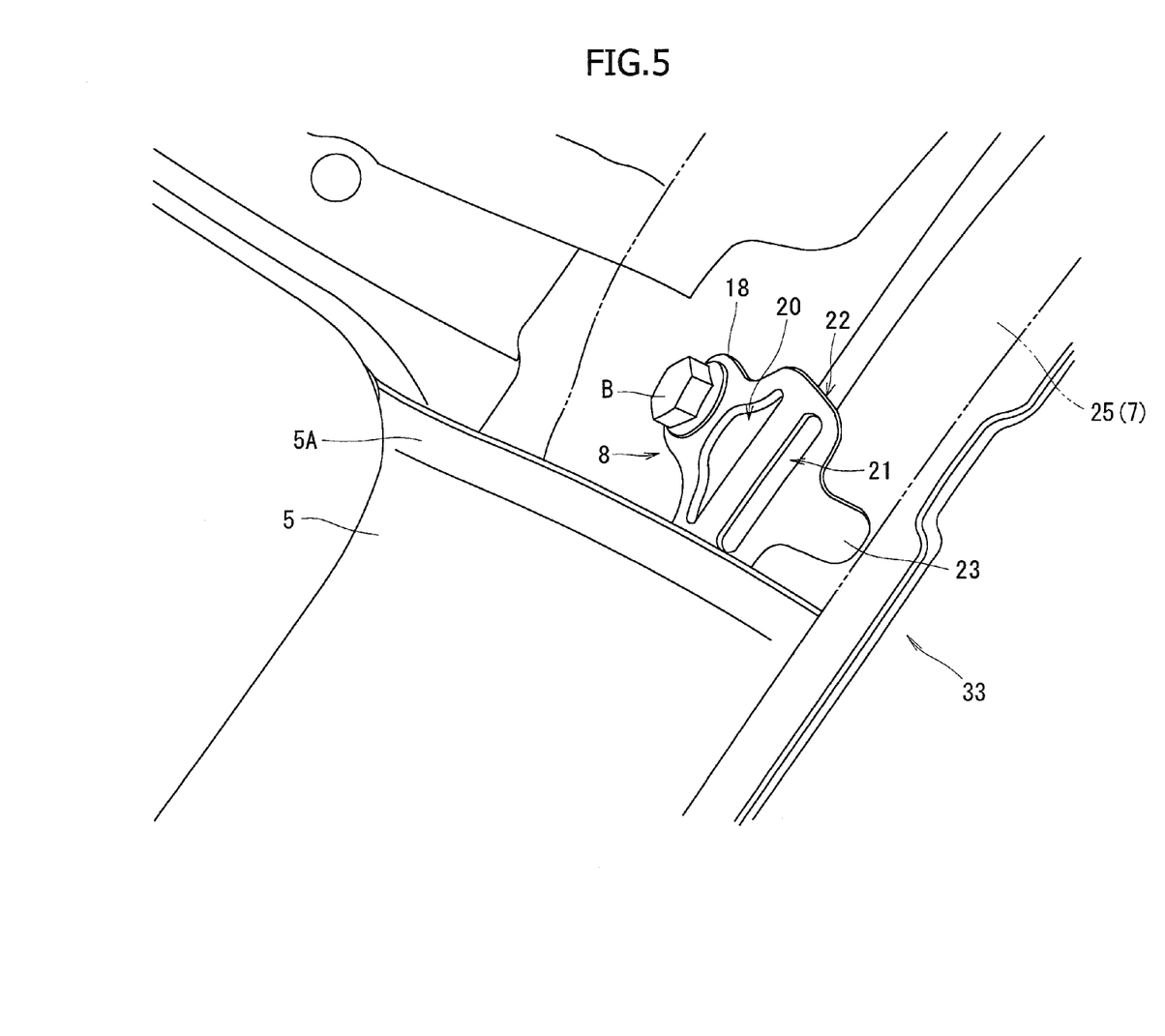
FIG. 5 is a view seen in the direction of arrow X in FIG. 3.
Figure 6:
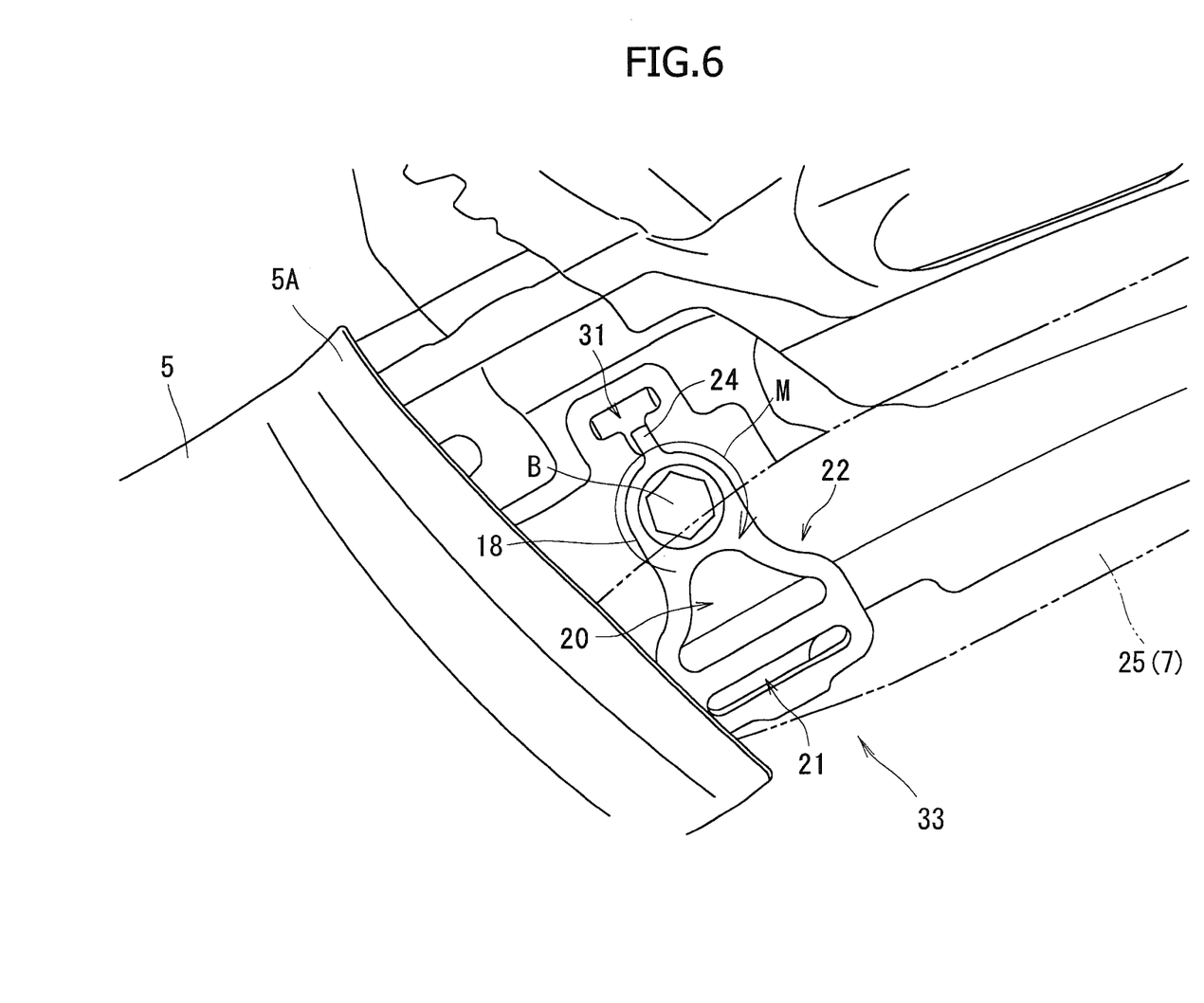
FIG. 6 is a diagram illustrating a rotation-stop mechanism of the attachment bracket.

As shown in FIG. 2, a plurality of roof members 2 are installed between a left and right pair of roof sides 1 of an automobile, at intervals in the front-rear direction of the vehicle. A roof panel 27 illustrated in FIG. 4 is attached to the left and right pair of roof sides 1 and the roof members 2 from above.

In addition, a headliner 3 is attached to the left and right pair of roof sides 1 and the roof members 2 from below. In addition, an opening trim 6 is attached to an opening periphery for the front door, which is formed on the roof side 1, front pillar 4, and the like (a lower end portion 1B of the roof side 1, a rear end portion 4B of the front pillar 4, and the like which are to be described later). Furthermore, as shown in FIG. 1, an airbag 7 for protecting the head of an occupant is attached across the front pillar 4 and roof side 1 via a plurality of attachment brackets 8.

Structure of Airbag 7

Figure 1:
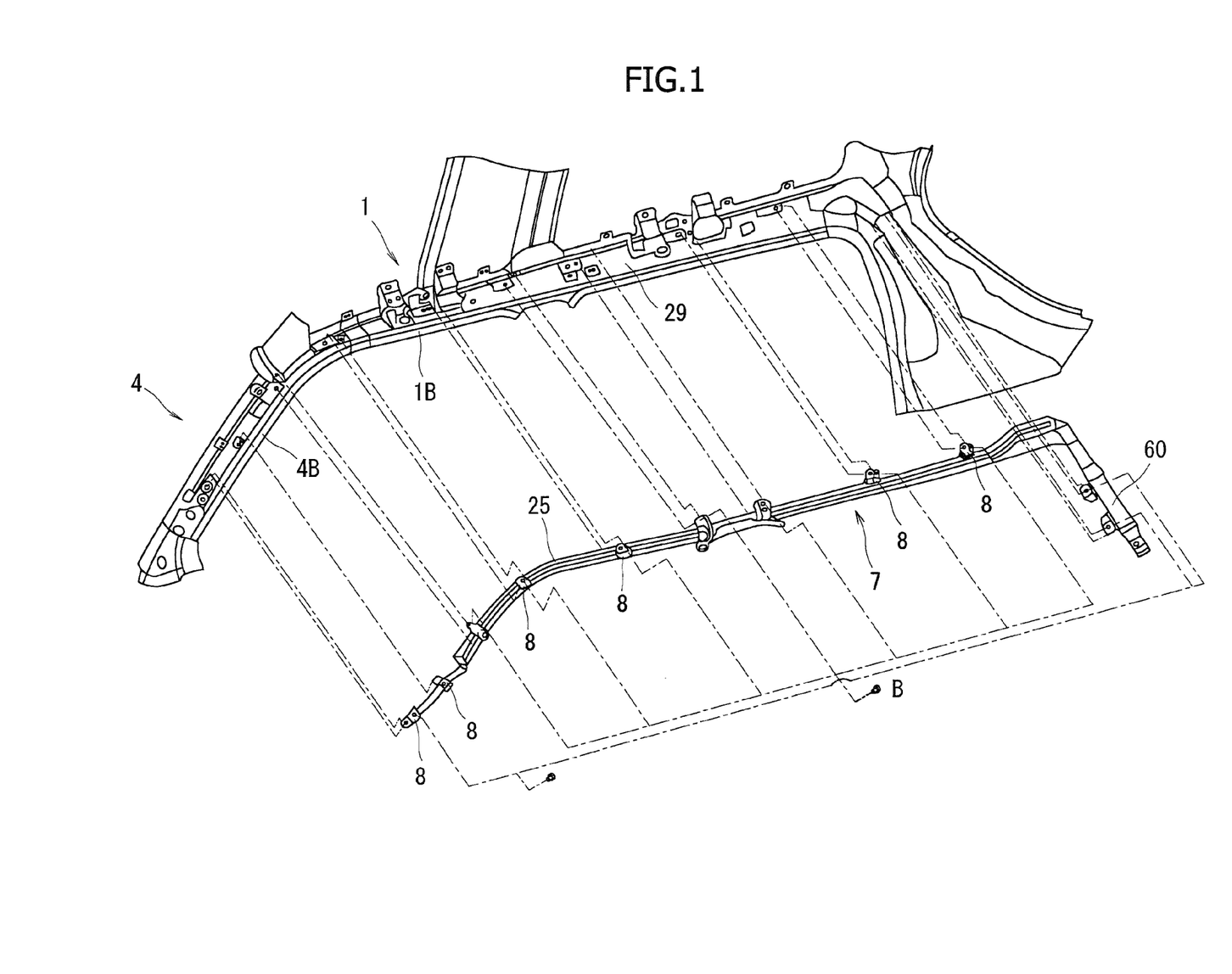
FIG. 1 is an exploded perspective view illustrating how an airbag for protecting the head of an occupant is attached across a roof side and a front pillar located above a lateral portion of the vehicle body.

The airbag 7 includes an elongated bag body 25 and an inflator 60 (refer to FIG. 1). The bag body 25 is built in the roof side 1 and the front pillar 4. The inflator 60 supplies the bag body 25 with gas to cause the bag body 25 to be inflated and deployed instantly. When being supplied with the gas by the inflator 60, the bag body 25 is inflated and deployed instantly, thus entering between the glass portions of the side doors and the occupants and thereby protecting the heads of the occupants.

Structure of Front Pillar 4

As shown in FIG. 4, the front pillar 4 includes a side body outer panel 28, a front pillar reinforcement 9, and a front pillar inner panel 10 (corresponding to a front pillar panel). The side body outer panel 28 has its middle portion in the width direction which projects in an obliquely outer front direction, and this middle portion of the side body outer panel 28 has a transverse U-shaped cross section. In addition, the front pillar reinforcement 9 has its middle portion in the width direction which projects toward a vehicle-width-direction outer side W2, and this middle portion of the front pillar reinforcement 9 has a transverse U-shaped cross section. The front pillar inner panel 10 has its middle portion in the width direction which projects toward a vehicle-width-direction inner side W1, and this middle portion of the front pillar inner panel 10 has an L-shaped cross section. Reference numeral 26 denotes a windshield glass.

Then, a front end portion (end portion in vehicle body front direction Fr) 28A of the side body outer panel 28, a front end portion 9A of the front pillar reinforcement 9, and a front end portion 10A of the front pillar inner panel 10 are superposed one upon another. In addition, an end portion 27A, which is the front end portion of the roof panel 27 toward the vehicle-width-direction outer side W2, is superposed on the front end portion 28A of the side body outer panel 28 from the front direction. As described, the four components are integrally bonded together by welding.

In addition, a rear end portion 28B of the side body outer panel 28, a rear end portion 9B of the front pillar reinforcement 9, and a rear end portion 10B of the front pillar inner panel 10 are superposed one upon another and bonded together by welding (these rear end portions are the edge portion in a vehicle body rear direction Rr, and correspond to the opening periphery for the front door. Thus, these superposed portions are hereinafter referred to as a "rear end portion 4B of the front pillar 4"). An end portion 3K of the headliner 3 in the vehicle width direction is formed in the shape of the letter L in cross section. An end edge 3K1 of the end portion 3K faces the rear end portion 4B of the front pillar 4 in the vehicle width direction with a gap S interposed therebetween.

Then, a U-shaped attachment base portion 11 of the opening trim 6 is fitted onto the rear end portion 4B of the front pillar 4, and a sidewall 11S1 on a vehicle interior inner side W1 of the attachment base portion 11 is entered into the gap S. A hollow sealing portion 12 to be compressed by the front door is provided in a sidewall 11S2 on a vehicle interior outer side W2 of the attachment base portion 11.

Furthermore, a lip 14 extends from a bottom portion 13 of the attachment base portion 11 toward the vehicle interior inner side W1 (vehicle-width-direction inner-side W1). The lip 14 is formed in an arc shape in cross section, protruding inward of the opening for the front door. The lip 14 thus retains the end portion 3K of the headliner 3 in the vehicle width direction in cooperation with a retaining portion 23 provided to the attachment bracket 8.

Structure of Roof Side 1

The roof side 1 comprises the side body outer panel 28, a roof side reinforcement (not illustrated), and a roof side inner panel 29 (corresponding to the roof side inner panel, refer to FIGS. 1 and 2)). The side body outer panel 28 has its middle portion in the width direction which projects in the vehicle interior outer side W2 (vehicle-width-direction outer side W2), and is elongated in the front-rear direction of the vehicle. The roof side reinforcement has its middle portion in the width direction which projects in the vehicle interior outer side, and is elongated in the front-rear direction of the vehicle. The roof side inner panel 29 has its middle portion in the width direction which projects toward the vehicle interior inner side, and is elongated in the front-rear direction of the vehicle.

Then, a lower end portion of the side body outer panel 28, a lower end portion of the roof side reinforcement, and a lower end portion of the roof side inner panel 29 are superposed one upon another and bonded together by welding (these lower end portions correspond to the opening periphery for the door. Thus, these superposed portions are hereinafter referred to as "a lower end portion 1B of the roof side 1," refer to FIG. 1). In addition, an upper end portion of the side body outer panel 28, an upper portion of the roof side reinforcement, and an upper end portion of the roof side inner panel 29 are superposed one upon another and bonded together by welding. Moreover, the U-shaped attachment base portion 11 of the opening trim 6 is fitted onto the rear end portion 1B of the roof side 1. The lip 14 of the opening trim 6 is brought into contact with the end portion 3K of the headliner 3 in the vehicle width direction from below.

The bag body 25 of the airbag 7 is wound into a roll, held at several portions by a tape. The bag body 25 is housed between the end portion 3K of the headliner 3 in the width direction and the front pillar inner panel 10 of the roof side 1, and between the front pillar trim 5 of the front pillar 4 and the front pillar inner panel 10. In addition, the bag body 25 supplied with gas from the inflator enters between the glass portion of the side door and the occupant from the gap S while pressing and bending, in the downward direction, the end portion 3K of the headliner 3 in the vehicle width direction, and thereby protects the head of the occupant.

Structure of Attachment Bracket 8

The plurality of attachment brackets 8 are arranged at intervals in the front-rear direction of the vehicle. One of the attachment brackets 8 is arranged on the back side of a periphery of a joint portion 33 (superposed portion) of the upper end portion of the front pillar trim 5 and the headliner 3 (upper side of the upper end edge of the front pillar trim 5). This attachment bracket 8 is attached and fixed to the front pillar inner panel 10 from the vehicle interior inner side W1 by a bolt B and a nut N, thereby suppressing the spreading of the bag body 25 (refer to FIG. 4).

As shown in FIG. 3 to FIG. 6, the attachment bracket 8 includes an upper end side attachment portion 18, a bag body holding portion 22 (corresponding to the holding portion), a retaining portion 23, and a narrow width hook 24 (corresponding to a locking portion). The upper end side attachment portion 18 is provided with a bolt insertion hole through which the attachment bolt B is inserted. In addition, the bag body holding portion 22 (corresponding to the holding portion) is arranged on the middle portion side in the upper-lower direction, and includes an upper and lower pair of bag body insertion holes 20 and 21. The retaining portion 23 extends in the vehicle interior outer side W2 from a center portion of the lower end portion of the bag body holding portion 22 in the width direction. Furthermore, the retaining portion 23 retains the end portion 3K of the headliner 3 in the vehicle width direction in cooperation with the lip 14 of the opening trim 6. The narrow width hook 24 extends in the vehicle interior outer side W2 from the upper end portion of the bag body holding portion 22. Here, the attachment bracket 8 is formed by pressing a single metal plate. The attachment bracket 8 is positioned toward the vehicle-width-direction outer side W2 from the bag body 25 of the airbag 7.

An outer periphery of the upper half of the attachment portion 18 is formed in an arc shape, and the hook 24 extends in the vehicle interior outer side W2 from the apex (upper end portion) of the attachment portion 18.

The bag body holding portion 22 is formed to be wider than the attachment portion 18. The bag body insertion hole 20 on the upper side is formed in a triangular hole shape, and each corner portion of the bag body insertion hole 20 on the upper side is formed in an arc shape. In addition, the bag body insertion hole 21 on the lower side is formed in a horizontally elongated hole.

A connection piece is sewed to the bag body 25 of the airbag 7, and this connection piece is inserted through the bag body insertion hole 21 on the lower side and the bag body insertion hole 20 on the upper side. The connection piece is folded so as to form a loop, and the end of the folded portion is sewn to a base end portion of the connection piece. Thus, the attachment bracket 8 is connected to the bag body 25 in the manner described above.

The retaining portion 23 is formed into a plate-shaped portion having a width smaller than that of the bag body holding portion 22, and extends toward the vehicle-width-direction outer side W2 (vehicle interior outer side W2) from the bag holding portion 22. To put it another way, the retaining portion 23 extends in a direction away from the bag body 25.

The retaining portion 23 of the attachment portion 18 and the lip 14 of the opening trim 6 retain the end portion 3K of the headliner 3 in the vehicle width direction. The hook 24 is inserted into a T-shaped hole 31 (corresponding to a locked portion) formed on the front pillar inner panel 10 and is locked with a lower end portion of the T shaped hole 31.

The hook 24 is inserted into the T-shaped hole 31 and is locked with the lower end portion of the T-shaped hole 31, thereby inhibiting rotation of the attachment bracket 8. The hook 24 also inhibits the rotation of the attachment bracket 8 during the operation of attaching and fixing the attachment bracket 8 to the front pillar inner panel 10 (or the roof side inner panel 29) by the attachment bolt B. Thus, the workability of the attachment operation of the attachment bracket 8 can be improved.

According to the aforementioned configuration, operational effects (1) through (3) below can be obtained.

(1) The attachment bracket 8 is arranged on the back side of the periphery of the joint portion 33 of the upper end portion of the front pillar trim 5 and the headliner 3 and thereby suppresses the spreading of the bag body 25, thus making it possible to prevent the headliner 3 from being lifted.

Thus, there is no need to increase the number of clips or the like for fixing the joint portion 33, or to provide the headliner 3 with a holder to stabilize the joint portion 33, as a measure to prevent the joint portion from being lifted.

In addition, deployment of the airbag 7 is not inhibited, and it is also possible to increase the degree of freedom in the layout of other components such as a harness and a drain hose provided in the roof side 1 and the front pillar 4.

Furthermore, the number of components can be reduced, and the manufacturing cost can be thus reduced. In addition, the number of assembly steps can be reduced as well.

(2) The lip 14 provided to the attachment base portion 11 of the opening trim 6 and the retaining portion 23 provided on the attachment bracket 8 retain the end portion 3K of the headliner 3 in the vehicle width direction. Thus, the headliner 3 can be surely prevented from being lifted.

In addition, even in a case in which a force to press the headliner 3 from the inner side of the vehicle interior is generated, the retaining portion 23 of the attachment bracket 8 on the back side of the headliner 3 surely receives the force. Thus, the end portion 3K of the headliner 3 in the vehicle width direction can be prevented from deforming. Accordingly, it is possible to prevent giving an impression of a lack of rigidity in the headliner 3 and thus to create an impression of a luxury interior structure.

(3) The retaining portion 23 extends toward the vehicle-width-direction outer side W2 (vehicle interior outer side W2) from the holding portion 22. Thus, the retaining portion 23 does not inhibit inflation and deployment of a curtain airbag 7 during the inflation and deployment of the curtain airbag 7.

(4) The hook 24 is inserted into the T-shaped hole 31 formed in the front pillar inner panel 10 and is locked with the lower end portion of the T-shaped hole 31. Thus, the attachment bracket 8 can be prevented from being misaligned with the headliner 3.

Here, the rotation of the attachment bracket 8 (see an arrow M in FIG. 6) can be prevented even with the only one attachment bolt B. Thus, as compared with a structure in which the rotation of the attachment bracket 8 is prevented by attachment and fixation of the attachment bracket 8 to the front pillar panel 10 by use of multiple attachment bolts B, for example, this structure allows a reduction in the number of components and also a reduction in the labor required for the attachment operation with the attachment bolt B.

Moreover, the rotation of the attachment bracket 8 can be prevented during the operation of attaching and fixing the attachment bracket 8 to the front pillar panel 10 by the attachment bolt B. Thus, the workability of the attachment operation can be improved. The attachment bracket 8 may be attached and fixed to the roof side inner panel 29 by the attachment bolt B. The T-shaped hole 31 may be formed on the roof side inner panel 29.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed. The following claims are provided to ensure that the present application meets all statutory requirements as a priority application in all jurisdictions and shall not be construed as setting forth the full scope of the present invention.

What is claimed is:

1. A roof structure for an automobile, comprising:
   an airbag configured to protect a head of an occupant; and
   an attachment bracket, wherein
   the airbag is attached across a front pillar and a roof side via the attachment bracket, and
   the attachment bracket is arranged on a back side of a periphery of a joint portion of an upper end portion of a front pillar trim and a headliner, thereby suppressing spreading of a bag body of the airbag;
   an attachment base portion of an opening trim is attached to an opening periphery for a door, the opening periphery formed on the front pillar and the roof side, and
   an end portion of the headliner in a vehicle width direction is retained between a lip provided on the attachment base portion of the opening trim and a retaining portion provided on the attachment bracket.

2. The roof structure for an automobile according to claim 1, wherein
   the attachment bracket includes a holding portion configured to hold the bag body of the airbag,
   the attachment bracket is positioned on a vehicle-width-direction outer side of the bag body of the airbag, and
   the retaining portion extends toward the vehicle-width-direction outer side from the holding portion.

3. The roof structure for an automobile according to claim 2, wherein
   the attachment bracket is attached and fixed by an attachment bolt to any one of a front pillar panel and a roof side panel, and
   the attachment bracket includes a locking portion configured to be locked with a locked portion and thereby to inhibit rotation of the attachment bracket, the locked portion formed on any one of the front pillar panel and the roof side panel.

4. The roof structure for an automobile according to claim 1, wherein
   the attachment bracket is attached and fixed by an attachment bolt to any one of a front pillar panel and a roof side panel, and
   the attachment bracket includes a locking portion configured to be locked with a locked portion and thereby to inhibit rotation of the attachment bracket, the locked portion formed on any one of the front pillar panel and the roof side panel.

* * * * *